United States Patent [19]

Lin et al.

[11] Patent Number: 5,380,467
[45] Date of Patent: Jan. 10, 1995

[54] COMPOSITION FOR EXTRACTING OXYGEN FROM FLUID STREAMS

[75] Inventors: Ching-Yu Lin, Monroeville; Richard P. Kunkle, Irwin; William Feduska, Edgeworth, all of Pa.

[73] Assignee: Westinghouse Electric Company, Pittsburgh, Pa.

[21] Appl. No.: 856,679

[22] Filed: Mar. 19, 1992

[51] Int. Cl.[6] .......................... H01B 1/06; C04B 35/48
[52] U.S. Cl. ..................... 252/520; 252/521; 501/103
[58] Field of Search .................. 252/520, 521; 501/103

[56] References Cited

U.S. PATENT DOCUMENTS

| | | | |
|---|---|---|---|
| 3,950,273 | 4/1976 | Jones | 252/521 X |
| 4,093,879 | 6/1978 | Marchant et al. | 252/520 X |
| 4,971,830 | 11/1990 | Jensen | 427/34 |
| 5,017,532 | 5/1991 | Sonnenberg et al. | 501/104 X |
| 5,035,962 | 7/1991 | Jensen | 204/291 X |

Primary Examiner—Donald R. Valentine
Attorney, Agent, or Firm—Hughes, Multer & Schacht

[57] ABSTRACT

Methods of and apparatus for generating high purity oxygen. Employed for this purpose is a "membrane cell" comprised of a praseodymia-modified, yttria-stabilized zirconia film that is fabricated onto a porous support, typically a tube of calcia-stabilized zirconia. This cell has the capability of "pumping" oxygen. As a consequence, oxygen in a pressurized fluid stream on the outer face of the membrane can be extracted from that stream and pumped as oxygen ions through the membrane without parasitic electric power and then released on the opposite side of the porous support tube as pure (electrolytic grade) oxygen. Extraction of pure oxygen continues as long as an oxygen partial pressure differential is maintained across the mixed conduction, "shorted" membrane. Oxygen thus produced can be used in industrial processes—for example, in coal gasification—or for other purposes.

8 Claims, 4 Drawing Sheets

$\circ \triangle \square = \{(ZrO_2)_{.93}(Y_2O_3)_{.07}\}_{.92}\{Pr_6O_{11}\}_{.08}$ $+ = \{(ZrO_2)_{.92}(Y_2O_3)_{.08}\}_{.92}[Pr_6O_{11}]_{.08}$ $T \sim 1000°C$

○ SINGLE SINTER
△ DOUBLE SINTER
□ TRIPLE SINTER
+ HOT PRESSED 5,380,467

COMPOSITION FOR EXTRACTING OXYGEN FROM FLUID STREAMS

TECHNICAL FIELD OF THE INVENTION

The present invention relates to processes and apparatus for extracting oxygen from fluid streams, to membrane cells for such processes and apparatus, and to electrically shorted compositions for such cells.

BACKGROUND OF THE INVENTION

The addition of environmentally clean electrical generation capacity has been targeted by the electrical utility industry as a goal for the 1990's and beyond.

Integrated gasification, combined cycle (IGCC) electric power plants have been identified as an one option for reaching this goal. Such plants or systems integrate clean coal gasification plants with combustion gas turbines and steam turbine/generators (combined cycle).

In one 100 megawatt electric power generating facility of this character, an entrained flow gasification unit is used to produce the clean coal gas needed by the gas turbine. This gasification process requires that large quantities of oxygen be delivered to the gasifier ($\sim 18 \times 10^6 ft^3$/oxygen per day, $\sim 95\%$ purity). This oxygen is produced by conventional liquefaction.

The oxygen-producing facility, with its air and oxygen compressors and heat exchangers, is complex and is sited over a considerable area. It requires a large capital investment; and it imposes a significant, parasitic electrical demand on the facility.

Electrochemical techniques for producing oxygen by extracting that compound from air have also been proposed. U.S. Pat. No. 4,908,113 issued 13 Mar. 1990 to Marianowski et al. and the prior art cited in that patent disclosure processes of that character which employ a molten electrolyte to effect the separation. Among other drawbacks of this process is that of safely employing molten electrolytes in the quantities needed for the large-scale generation of oxygen.

SUMMARY OF THE INVENTION

There has now been invented, and disclosed herein, a novel, all solid state, cell-type oxygen generator which is capable of alleviating the above-discussed drawbacks of liquefaction type, molten electrolyte, and other oxygen generators. Reactors employing groups of these cells can be employed: (a) to meet the high oxygen demands of plants such as those discussed above; and (b) with smaller, or even larger, capacities for other oxygen-requiring applications.

The oxygen generating cell of the present invention consists of a very thin, internally shorted, mixed conduction (ionic/electronic), praseodymium-modified, yttria-stabilized, gastight film fabricated onto one side of a porous, typically tubular support. As long as a partial pressure difference exists across the membrane film, oxygen ions are "pumped" across the membrane and converted to oxygen molecules on the opposite of the film.

Reactors employing the principles of the present invention and designed to produce oxygen in large quantities consist of evenly spaced membrane cells in an insulated containment. Each membrane cell directly extracts pure (electrolytic grade) oxygen from a preheated, pressurized gas stream. This will typically be air diverted from a compressor inlet or an oxygen-containing gas turbine exhaust stream in an IGCC facility. Since it is operated solely by the oxygen partial pressure difference across the membrane, the oxygen-producing process imposes no parasitic electrical demand on the facility.

As will be apparent to the reader from the foregoing, oxygen generators employing the principles of the present invention are not complex; and they do not have the electrical power demands of conventional liquefaction-type oxygen generators. Space requirements are modest as are the costs of constructing and operating such a generator.

OBJECTS OF THE INVENTION

One important and primary object of the present invention is the provision of novel, solid state, oxygen generating cells with internally shorted, praseodymium-modified, yttria-stabilized membranes.

Another important and primary object of the present invention is the provision of novel, improved methods and apparatus for generating high purity oxygen.

Other also important, but more specific objects of the invention reside in the provision of methods of generating oxygen as defined in the preceding object:

which do not require complex, capital intensive installations;

which do not require the parasitic power of conventional, liquefaction-type oxygen producers;

which can be carried out in systems that can be sited on significantly smaller areas than are required by conventional, liquefaction-type, oxygen generating installations.

Still other important although more specific objects of the invention reside in the provision of oxygen generating apparatus with the attributes identified in the preceding set of objects and in the provision of membrane cells for such apparatus.

Still other important objects of the invention, as well as additional features and advantages, will be apparent to the reader from the foregoing and the appended claims and as the ensuing detailed description and discussion of the invention proceeds in conjunction with the accompanying drawings.

DETAILED DESCRIPTION OF THE INVENTION

Figure 1:
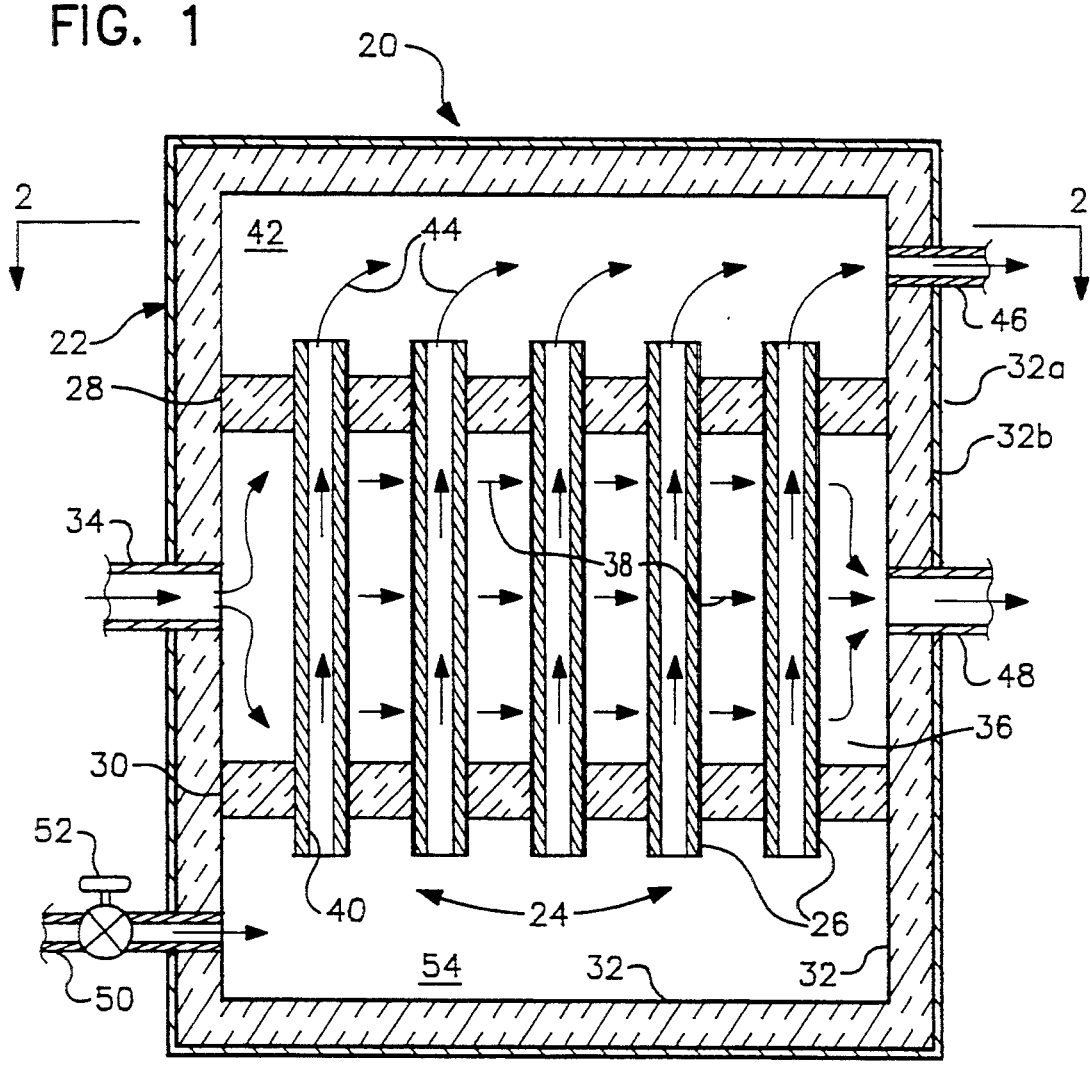
FIG. 1 is a vertical section through a reactor for extracting oxygen from fluids, that reactor being constructed in accord with the principles of the present invention.
Figure 2:
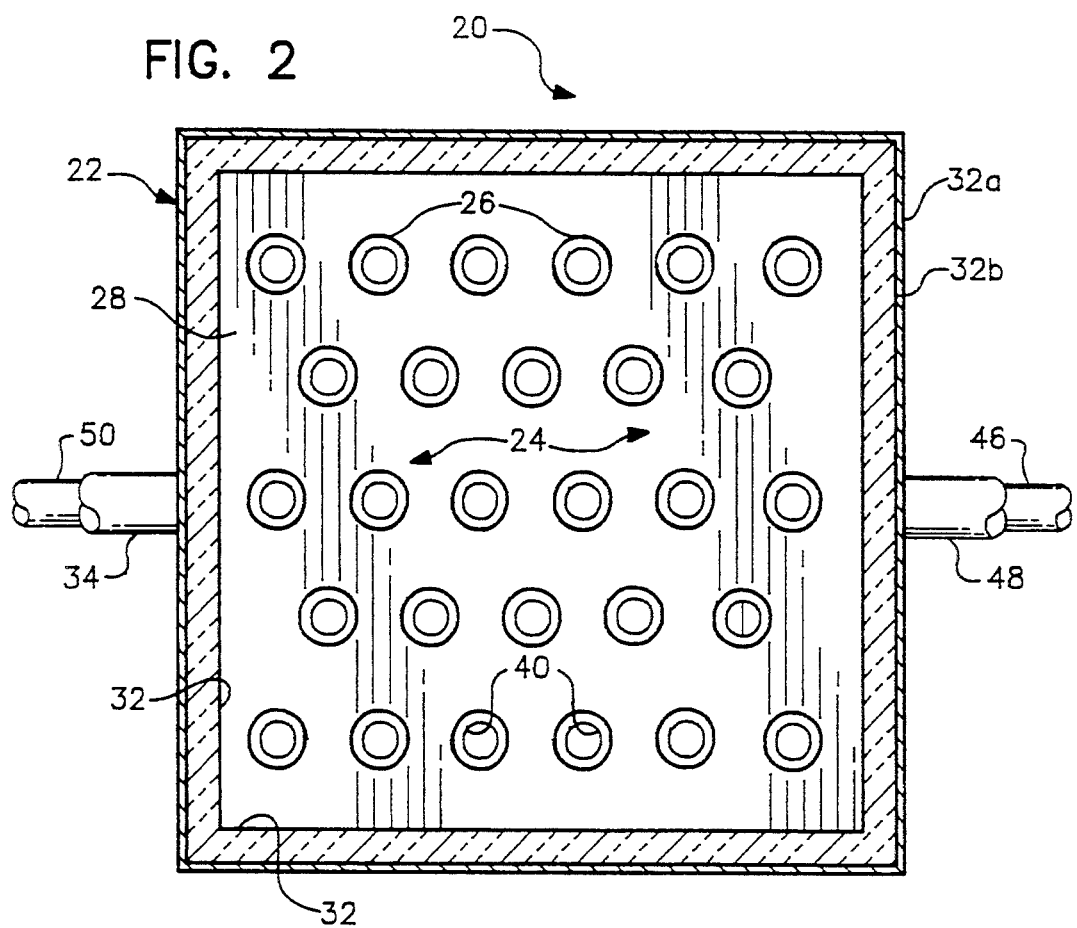
FIG. 2 is a section through the reactor of FIG. 1, taken substantially along line 2—2 of the latter figure.
Figure 2A:
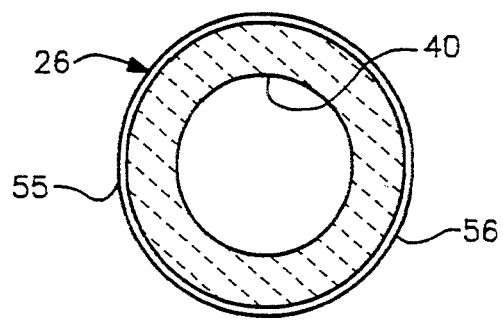
FIG. 2A is an end view of an oxygen extraction cell which also embodies the principles of the present invention and is employed in the reactor of FIG. 1.

Referring now to the drawing, FIGS. 1 and 2 depict an oxygen generator or reactor 20 embodying the principles of the present invention. Reactor 20 includes: (1) a containment vessel 22; a staggered row and column array 24 of membrane cells 26, also embodying the principles of the present invention; and upper and lower supports 28 and 30. These components support membrane cells 26 in a parallel, spaced apart relationship and in a selected spatial arrangement from the walls (collectively identified by reference character 32) of reactor containment vessel 22.

As suggested above, the gases processed through reactor 20 may be at high temperature; e.g., they may be gas turbine engine exhaust gases. In these applications, containment vessel walls 32 and cell supports 28 and 30 will be fabricated from, or lined with, high temperature resistant materials. For example, in the exemplary containment vessel 22 shown in FIGS. 1 and 2, the walls 32 are formed of metal sheet or plate 32a and an inner refractory liner 32b. Upper and lower membrane cell supports 28 and 30 are fabricated from an appropriate refractory. The specific materials as well as the structural details of the containment vessel and supports, construction techniques, etc. are not part of the present invention and not necessary to an understanding of that invention. Accordingly, they will not be elucidated herein.

The fluid from which the oxygen is to be extracted—typically, preheated air or gas turbine engine exhaust gases—is introduced via a line 34 into one end of a flow passage 36 in reactor containment vessel 22. This flow passage is defined by upper and lower membrane cell supports 28 and 30 and the side and end walls of the containment vessel. Fluid flows through passage 36 in the direction indicated by arrows 38 (FIG. 1) and over the membrane cells 26, which pump oxygen from the flowing fluid into passages 40 extending from end-to-end through the cells. The oxygen flows into an outlet plenum 42 as indicated by arrows 44 and is removed through an oxygen outlet line 46. Oxygen-depleted gases or fluids are removed from containment vessel 22 through a second outlet line 48.

A purge gas line 50, in which a valve 52 is installed, communicates with a purge gas inlet plenum 54 located in reactor containment vessel 22. This plenum is in fluid communication with the passages 40 through membrane cells 26. A purging gas can be introduced through line 50 to flush those parts of reactor 20—the passages 40 in membrane cells 26 and oxygen discharge plenum 42—which contain extracted oxygen. This promotes the purity of the oxygen outputted from reactor 22.

A reactor 20 capable of supplying 800 tons oxygen/day as is required for the IGCC facility discussed above may have 440,000 cells 26, each 1.25 cm in diameter and one meter long. Each cell would deliver ~1253 liters (1.8 kg) of oxygen/day, operating at ~1000° C. With the cells 26 spaced on 1.9 cm (0.75 inch) centers, reactor 20 would occupy a volume of approximately 44 feet by 44 feet by 6 feet in height. This space is significantly smaller, and the reactor would be considerably less complex, than the existing cryogenic oxygen plant.

Each membrane cell 26 consists of a very thin, mixed conduction (ionic/electronic), internally shorted, gastight film or membrane 55 fabricated as by electrochemical vapor deposition onto a porous support tube 56.

Support 56 is typically fabricated of a porous material which will remain structurally and chemically stable at high temperature. One preferred material is conventional, calcia-stabilized zirconia.

An internally shorted membrane, as employed in cell 26, is described below. It is one fabricated from a composition in which the mobility (transference) of ions and electrons are equivalent, i.e., t ions = t electrons and ti+te = 1. At elevated temperatures (about 800° to 1000° C.), YSZ (yttria-stabilized zirconia) is a nearly perfect oxygen ion conductor; i.e., ti approaches 1. YSZ is therefore preferably employed as a base composition in fabricating the membrane. Electronic conduction is imparted to YSZ with an oxide constituent or additive having predominantly electronic conduction at elevated temperature in an amount that will achieve equivalent electronic/ionic conduction in the resultant composition.

Praseodymium oxide is the additive employed to impart electronic conduction to the basic YSZ composition. Praseodymium oxide was chosen as it is known to exhibit electronic conduction at high temperatures, because it can vary in its degree of oxidation (from 3+ to 4+ oxidation states), and because it can accordingly release electrons to the membrane internal short circuit. Praseodymium is also known to remain stable in an oxidizing environment (ranging from low oxygen partial pressure to pure oxygen) at elevated temperature.

The formula for the membrane forming compositions of the present invention is:

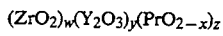
$(ZrO_2)_w(Y_2O_3)_y(PrO_{2-x})_z$ where:
w is 0.56 to 0.70,
x is 0 to 0.04,
y is 0.04 to 0.06, and
z is 0.24 to 0.40.

Representative, operable compositions of the foregoing formulation are:

$[(ZrO_2)_{0.93}(Y_2O_3)_{0.07}]_{0.70}[Pr_6O_{11}]_{0.30}$

$[(ZrO_2)_{0.93}(Y_2O_3)_{0.07}]_{0.90}[Pr_6O_{11}]_{0.10}$

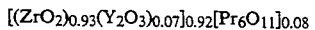
$[(ZrO_2)_{0.93}(Y_2O_3)_{0.07}]_{0.92}[Pr_6O_{11}]_{0.08}$

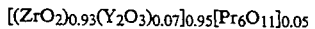
$[(ZrO_2)_{0.93}(Y_2O_3)_{0.07}]_{0.95}[Pr_6O_{11}]_{0.05}$

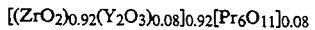
$[(ZrO_2)_{0.92}(Y_2O_3)_{0.08}]_{0.92}[Pr_6O_{11}]_{0.08}$

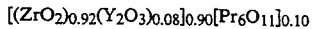
$[(ZrO_2)_{0.92}(Y_2O_3)_{0.08}]_{0.90}[Pr_6O_{11}]_{0.10}$

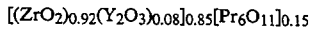
$[(ZrO_2)_{0.92}(Y_2O_3)_{0.08}]_{0.85}[Pr_6O_{11}]_{0.15}$

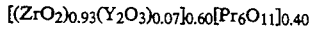
$[(ZrO_2)_{0.93}(Y_2O_3)_{0.07}]_{0.60}[Pr_6O_{11}]_{0.40}$

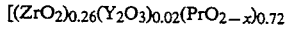
$[(ZrO_2)_{0.26}(Y_2O_3)_{0.02}(PrO_{2-x})_{0.72}$

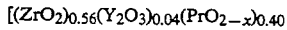
$[(ZrO_2)_{0.56}(Y_2O_3)_{0.04}(PrO_{2-x})_{0.40}$

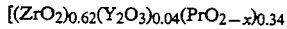
$[(ZrO_2)_{0.62}(Y_2O_3)_{0.04}(PrO_{2-x})_{0.34}$

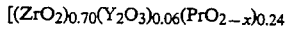
$[(ZrO_2)_{0.70}(Y_2O_3)_{0.06}(PrO_{2-x})_{0.24}$

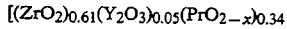
$[(ZrO_2)_{0.61}(Y_2O_3)_{0.05}(PrO_{2-x})_{0.34}$

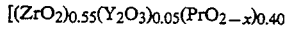
$[(ZrO_2)_{0.55}(Y_2O_3)_{0.05}(PrO_{2-x})_{0.40}$

[(ZrO$_2$)$_{0.45}$(Y$_2$O$_3$)$_{0.04}$(PrO$_{2-x}$)$_{0.51}$]

[(ZrO$_2$)$_{0.19}$(Y$_2$O$_3$)$_{0.01}$(PrO$_{2-x}$)$_{0.80}$]

Of the foregoing compositions,

[ZrO$_2$)$_{0.92}$(Y$_2$O$_3$)$_{0.08}$]$_{0.92}$[Pr$_6$O$_{11}$]$_{0.08}$ is preferred at the present time for the purposes of the present invention.

The mixed ionic-electronic conduction compositions of the present invention have nearly ionic-to-electronic equivalence at 900°–1000° C. (a transference number in the range of 0.40 to 0.65), a reasonable resistivity of 10 to 90 ohm.cm to minimize driving voltage losses across the membrane, and a thermal coefficient of expansion matching that of calcia-stabilized zirconia (RT to 1000° C.). The latter characteristic is important as it prevents the buildup of excessive thermal expansion stresses in the thin membrane. Such stresses are undesirable as they could cause the film (or membrane) to fracture, decreasing the membrane operating efficiency by allowing air dilution and contamination of the pure oxygen being produced.

Also, to adequately conduct oxygen ions, the membrane 55 must be impervious to air and oxygen gases and must typically be not more than ~20 μm thick.

Figure 3:
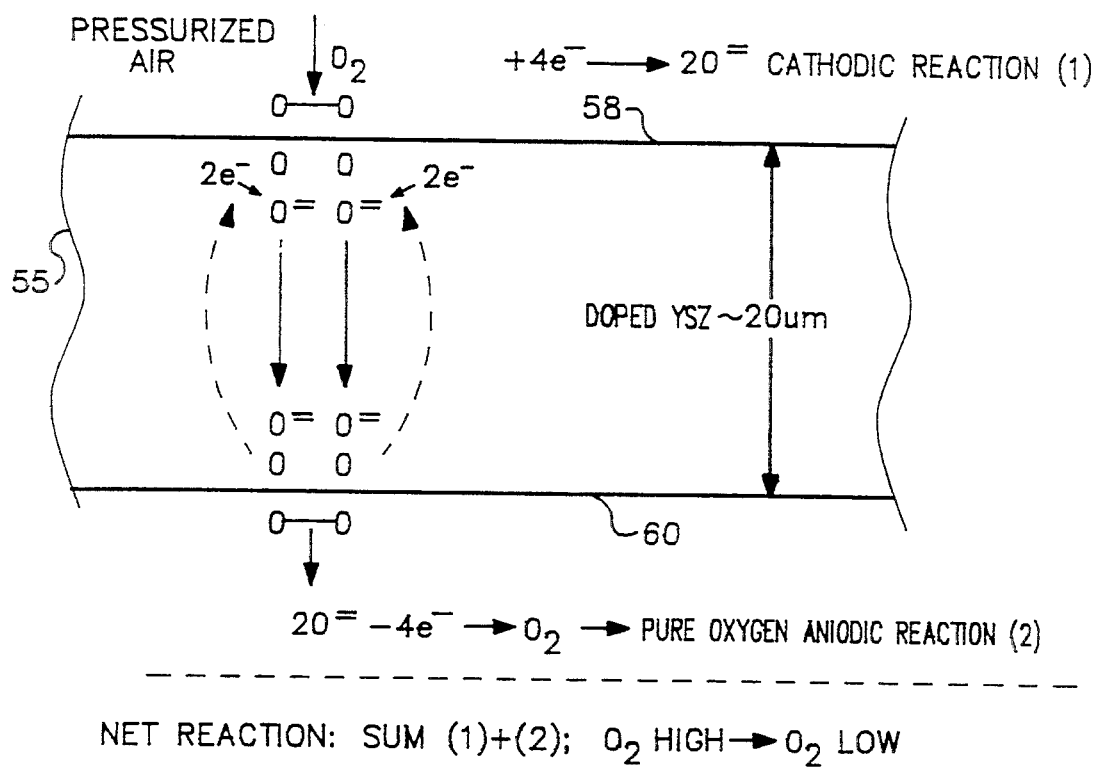
FIG. 3 is a diagram showing the reactions involved in extracting oxygen from a fluid with a membrane cell employing the principles of the present invention.

The manner in which the membranes 55 of the novel cells 26 just described function to extract oxygen from gas mixtures containing that compound is shown in FIG. 3. As long as an oxygen partial pressure differential exists across the membrane 55, oxygen ions generated at the high or cathode side 58 of the membrane 34 will be pumped across the membrane and converted to oxygen molecules on the opposite, low or anode side 60 of the membrane.

Figure 4:
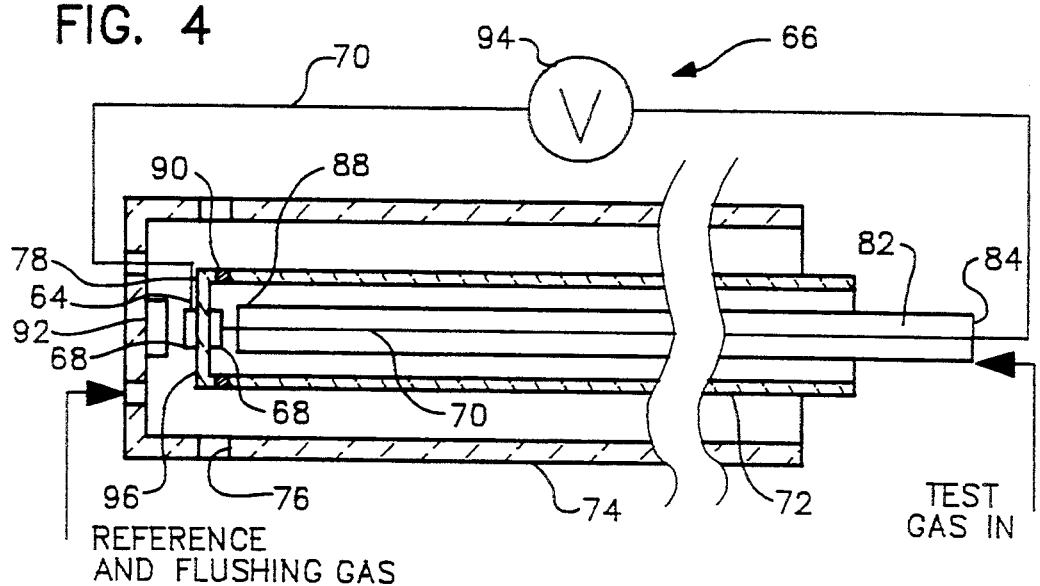
FIG. 4 is a schematic of a test system employed to evaluate potential membrane compositions that are capable of extracting oxygen from a fluid stream by the technique disclosed herein.
Figure 5:
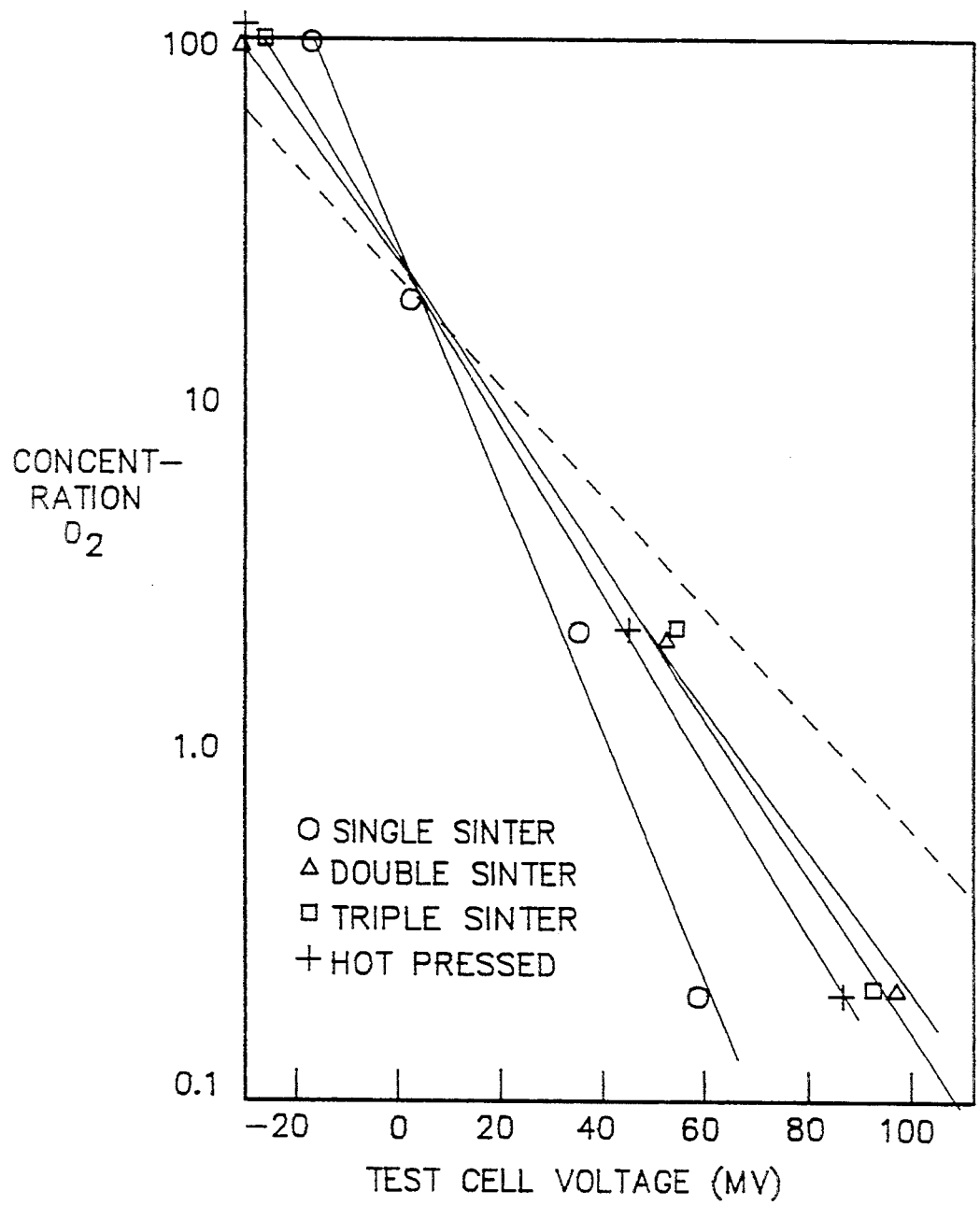
FIG. 5 is a graph showing the effect of different membrane fabrication techniques on the efficiency of the oxygen extraction process.

The oxygen extraction efficiency of a candidate membrane composition can be verified by measuring the ionic (ti) and electronic (te) transference values of a sample 64 having the selected formulation with the apparatus 66 illustrated in FIG. 4. Platinum powder electrodes 68 and platinum wire leads are attached to both faces of the sample.

The formulation evaluation apparatus 66 includes an alumina tube 72 surrounded by a tube 74 with gas outlets 76 at its closed end 78. Installed in tube 72 is a flow tube 82, also typically fabricated from alumina. A test gas is introduced into the inlet end 84 of tube 82.

The sample 64 to be evaluated is mounted on tube 82 at the outlet or discharge end 88 of test gas flow tube 82, and the gap between tube 72 and the sample is sealed as by a gold O-ring 90. The setting up of apparatus 66 is completed by installing an alumina spacer 92 at the closed end 78 of outer tube 74 and by connecting the platinum leads 70 at the opposite sides of sample 66 to a voltmeter 94.

Test rig 66 is thoroughly flushed before evaluating a sample by introducing an appropriate gas into the rig through inlet port 96 in the closed end of outer tube 74. The flow of a heated gas through tube 82 is then initiated.

The sample 66 and both electrodes 68 are exposed at elevated temperature (900°–1000° C.) to gas atmospheres with known, but different, oxygen partial pressures. At the elevated temperatures, the voltage across the electrodes 68 is measured (Eexp) and compared with the calculated Nernst-Einstein voltage. If the voltage agrees with the Nernst-Einstein voltage, no electronic conduction is present since an electronic conduction component always lowers the theoretically expected voltage. Air is used as the reference test gas because it is one of the reactants in typical applications of the disclosed materials. With Eexp found and Eth determined, ti is calculated from the following relationship:

$$Eexp = (1-te)Eth = ti\ Eth$$

and te is simply 1−ti. A transference number of 0.5 for both ti and te indicates equivalent ionic and electronic conduction. The relationship holds for constant transference numbers across the electrolyte. Therefore, measuring Eexp allows a determination of ti and te.

Electrical resistivities of the test pellets are also measured in the same test apparatus using a conventional two probe technique and a Keithley 160B meter. Results of these measurements are given in Table 1.

TABLE 1

Test Results Obtained From Evaluating Praseodymia-Modified Yttria-Stabilized Zirconia
[(ZrO$_2$)$_{.93}$(Y$_2$O$_3$)$_{.07}$]$_x$[Pr$_6$O$_{11}$]$_{1-x}$ and [ZrO$_2$)$_{.92}$(Y$_2$O$_3$)$_{.08}$]$_x$[Pr$_6$O$_{11}$]$_{1-x}$

| (YSZ) X | (Pr$_6$O$_{11}$) 1 − X | Sintering Condition | Test Temp °C. | Transference Number | Electrical Resistivity ρ (Ω · C) |
|---|---|---|---|---|---|
| 0.95 | 0.05 | single | 900 | 0.87 | 82 |
| 0.92 | 0.08 | single | 900 | 0.44 | 163 |
| 0.92 | 0.08 | single | 1000 | 0.50 | 94 |
| 0.90 | 0.10 | single | 900 | 0.36 | 182 |
| 0.85 | 0.15 | single | 900 | 0.07 | 41 |
| 0.85 | 0.15 | single | 1000 | 0.09 | 29 |
| 0.95 | 0.05 | double | 900 | 0.83 | 94 |
| 0.92 | 0.08 | double | 900 | — | — |
| 0.92 | 0.08 | double | 1000 | 0.72 | 67 |
| 0.90 | 0.10 | double | 900 | 0.54 | 188 |
| 0.90 | 0.10 | double | 1000 | 0.57 | 133 |
| 0.85 | 0.15 | double | 900 | 0.10 | 26 |
| 0.85 | 0.15 | double | 1000 | 0.08 | 17 |
| 0.70 | 0.30 | double | 900 | 0 | 4 |
| 0.92 | 0.08 | triple | 900 | 0.69 | 118 |
| 0.92 | 0.08 | triple | 1000 | 0.75 | 57 |
| 0.90 | 0.10 | triple | 900 | 0.80 | 100 |
| 0.90 | 0.10 | triple | 1000 | 0.83 | 60 |
| 0.85 | 0.15 | triple | 1000 | 0.06 | 24 |

The samples employed in the tests which produced the data in Table 1 were about 1.27 mm thick. The pellets were initially prepared by blending, cold pressing, and sintering. Later, hot pressing was employed to more completely homogenize the oxides making up the candidate compositions. The procedures employed to prepare the test samples are described in Tables 2 and 3.

TABLE 2

| Procedure For Preparing Specimens Of Selected Membrane Compositions | |
|---|---|
| 1. | Powder Preparation |
| ○ | Wet ball mill powders of the selected compositions for a minimum of 2 hours |
| ○ | Oven dry at 120° C./overnight |
| 2. | Pellet Preparation |
| ○ | Die press powders from (1) at 352 MPa (51,000 psi) to 1.27 cm (0.50 inch) diameter by 2 mm (0.080 inch) thickness |
| ○ | Sinter pellet at 1350° C. for 1 hour in air |
| ○ | Regrind to powder |
| ○ | Repress (as before) |
| ○ | Resinter at 1550° C. for 2 hours in air |
| ○ | Regrind, repress, resinter at 1550° C. for 2 hours in air |
| Notes: | |
| ○ | Final pellet size is ~1.07 cm (.42 inch) |

TABLE 2-continued

Procedure For Preparing Specimens Of Selected Membrane Compositions

○    diameter by 1.27 mm (.050 inch) thickness Pellet (i.e., sample 44) faces are polished to 1.02 cm (.40 inch) thickness to insure proper sealing contact with the gold "O" ring seal 90 of test fixture 66

TABLE 3

Hot Pressing Procedures For Preparing Selected Membrane Compositions
Example: $[(ZrO_2)_{.92}(Y_2O_3)_{.08}]_{.92}[Pr_6O_{11}]_{.08}$ Powder Formulation 1) Powder Preparation
   Same as described in Table 2
2) Pellet Preparation
   Hot press at 1450° C., 4000 psi (#1) and 1500° C., 5000 psi (#2), under vacuum using a 1" diameter Grafoil-lined graphite die. The pressure is maintained at each temperature for 1 hour The exemplary formulation identified in Table 3 was evaluated in fixture 66 with the protocol described above. Test results appear in Table 4 and are graphically compared with the results obtained by preparing test samples of the same formulation but with the Table 2 technique in FIG. 4.

TABLE 6

Transference Number and Electrical Resistivity of Praseodymia-Modified, Yttria-Stabilized Zirconia Prepared By Hot Pressing $[(ZrO_2)_{.92}(Y_2O_3)_{.08}]_{.92}[Pr_6O_{11}]_{.08}$
1450° C., 4000 psi for 1 Hour in Vacuum-Sample 1
1500° C., 5000 psi for 1 Hour in Vacuum-Sample 2

| Test Sample | Test Temperature (°C.) | Transference Number | Electrical Resistivity, $\rho$ ($\Omega \cdot cm$) |
|---|---|---|---|
| 1 | 900 | 0.54 | 90 |
|   | 1000 | 0.63 | 60 |
| 2 | 900 | 0.54 | — |
|   | 1000 | 0.60 | 73 |
| 2* | 1000 | 0.60 | 72 |

*Repeat of test after cooling the sample down to room temperature and reheating it to the test temperature The test results demonstrated that a formulated powder mixture of $[(ZrO_2)_{0.92}(Y_2O_3)_{0.08}]_{0.92}[Pr_6O_{11}]_{0.08}$, fabricated by the hot pressing technique, produced test specimens of the desired high homogeneity and density. For the resultant composition, $(ZrO_2)_{0.61}(Y_2O_3)_{0.05}(PrO_{2-x})_{0.34}$, transference numbers of 0.54 and 0.63 and electrical resistivities of 90 and 60 $\Omega$.cm were obtained at 900° and 1000° C., respectively. These results compare favorably with targeted properties of 0.50 transference number and 10 $\Omega$.cm electrical resistivity at 1000° C. for a 20 $\mu$m thick membrane.

This same composition was then tested for thermal expansion. A coefficient of $10.5 \times 10^{-6}$/° C. (RT to 1000° C.). was obtained in air. This closely, and desirably, matches the coefficient of the porous calcia-stabilized zirconia which can serve as a support in membrane cells embodying the principles of the present invention.

That application of the present invention most often referred to above involves the use of the membrane cells disclosed herein to generate high purity oxygen for an IGCC facility. This is not intended to limit the scope of the invention as defined in the appended claims as it will be apparent to the reader that the present invention is useful in unnumbered applications in which high purity oxygen can advantageously be extracted from an oxygen-containing mixture of gases.

The invention may be embodied in still other forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A praseodymia-modified, yttria-stabilized zirconia which has a nearly ionic-to-electronic equivalence at elevated temperatures, said composition having a coefficient of expansion closely matching that of calcia-stabilized zirconia over the temperature range of room temperature to at least $\sim 1000°$ C.

2. A praseodymia-modified, yttria-stabilized zirconia which has a nearly ionic-to-electronic equivalence at elevated temperatures, said composition being the reaction product of a hot pressed and sintered particulate mixture with a nominal formula of $[(ZrO_2)_{0.92}(Y_2O_3)_{0.08}]_{0.92}[Pr_6O_{11}]_{0.08}$.

3. A praseodymia-modified, yttria-stabilized zirconia which has a nearly ionic-to-electronic equivalence at elevated temperatures, said composition having the nominal formula of $(ZrO_2)_{.61}(Y_2O_3)_{.05}(Pr_6O_{11})_{.34}$.

4. A praseodymia-modified, yttria-stabilized zirconia which has a nearly ionic-to-electronic equivalence at elevated temperatures, said composition having the formula $(Zr_2O_3)_w(Y_2O_3)_x(PrO_{2-x})_z$ where:
   w is 0.56 to 0.70,
   x is 0 to 0.04,
   y is 0.04 to 0.06, and
   z is 0.24 to 0.40.

5. A praseodymia-modified, yttria-stabilized zirconia composition which has a nearly ionic-to-electronic equivalence at elevated temperatures, said composition having a nominal composition which is one of the following:

$[(ZrO_2)_{0.93}(Y_2O_3)_{0.07}]_{0.70}[Pr_6O_{11}]_{0.03}$ $[(ZrO_2)_{0.93}(Y_2O_3)_{0.07}]_{0.90}[Pr_6O_{11}]_{0.10}$ $[(ZrO_2)_{0.93}(Y_2O_3)_{0.07}]_{0.92}[Pr_6O_{11}]_{0.08}$ $[(ZrO_2)_{0.93}(Y_2O_3)_{0.07}]_{0.95}[Pr_6O_{11}]_{0.05}$ $[(ZrO_2)_{0.92}(Y_2O_3)_{0.08}]_{0.90}[Pr_6O_{11}]_{0.10}$ $[(ZrO_2)_{0.92}(Y_2O_3)_{0.08}]_{0.85}[Pr_6O_{11}]_{0.15}$ $[(ZrO_2)_{0.93}(Y_2O_3)_{0.07}]_{0.06}[Pr_6O_{11}]_{0.40}$

6. A praseodymia-modified, yttria-stabilized zirconia composition which has a nearly ionic-to-electronic equivalence at elevated temperatures, said composition having a nominal formulation which is one of the following:

$(ZrO_2)_{0.26}(Y_2O_3)_{0.02}(PrO_{2-x})_{0.72}$ $(ZrO_2)_{0.56}(Y_2O_3)_{0.04}(PrO_{2-x})_{0.40}$ $(ZrO_2)_{0.62}(Y_2O_3)_{0.04}(PrO_{2-x})_{0.34}$ $(ZrO_2)_{0.70}(Y_2O_3)_{0.06}(PrO_{2-x})_{0.24}$ $(ZrO_2)_{0.61}(Y_2O_3)_{0.05}(PrO_{2-x})_{0.34}$ $(ZrO_2)_{0.55}(Y_2O_3)_{0.05}(PrO_{2-x})_{0.40}$ $(ZrO_2)_{0.45}(Y_2O_3)_{0.04}(PrO_{2-x})_{0.51}$ $(ZrO_2)_{0.19}(Y_2O_3)_{0.01}(PrO_{2-x})_{0.80}$ where x is 0 to 0.4.

7. A composition which has a nearly ionic-to-electronic equivalence at elevated temperatures, said composition consisting essentially of a yttria-stabilized zirconia and a praseodymium oxide in an amount effective to impart electronic conduction to said yttria-stabilized zirconia and having a transference number in the range of 0.40 to 0.65.

8. A composition which has a nearly ionic-to-electronic equivalence at elevated temperatures, said composition consisting essentially of a yttria-stabilized zirconia and a praseodymium oxide in an amount effective to impart electronic conduction to said yttria-stabilized zirconia and having a resistivity in the range of 10 to 90 ohm.cm.

* * * * *